United States Patent
Kim et al.

(10) Patent No.: US 8,060,114 B2
(45) Date of Patent: *Nov. 15, 2011

(54) MOBILE COMMUNICATION SYSTEM AND METHOD FOR CAPTURING INFORMATION OF OTHER MOBILE COMMUNICATION TERMINALS

(75) Inventors: Sung Choul Kim, Icheon-si (KR); Man Seok Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/944,436

(22) Filed: Nov. 11, 2010

(65) Prior Publication Data

US 2011/0059753 A1    Mar. 10, 2011

Related U.S. Application Data

(63) Continuation of application No. 12/693,142, filed on Jan. 25, 2010, which is a continuation of application No. 11/021,778, filed on Dec. 23, 2004, now Pat. No. 7,668,553.

(30) Foreign Application Priority Data

Dec. 26, 2003 (KR) .................. 10-2003-0097296
Nov. 2, 2004 (KR) .................. 10-2004-0088333

(51) Int. Cl.
*H04W 24/00* (2009.01)
(52) U.S. Cl. ............... 455/456.1; 455/404.1; 455/404.2; 455/414.1; 455/414.2; 455/433; 701/200; 701/213; 701/216; 701/300

(58) Field of Classification Search ......... 455/456.1, 455/404.1, 404.2, 414.1, 414.2, 435.1, 440; 701/200, 210, 213, 216, 217, 224, 225, 300
See application file for complete search history.

(56) References Cited

U.S. PATENT DOCUMENTS

| | | | |
|---|---|---|---|
| 7,668,553 | B2 | 2/2010 | Kim et al. |
| 2001/0048364 | A1 | 12/2001 | Kalthoff et al. |
| 2004/0249560 | A1 | 12/2004 | Kim et al. |
| 2005/0090294 | A1* | 4/2005 | Narasimhan ............ 455/575.1 |
| 2008/0186162 | A1* | 8/2008 | Rajan et al. ............ 340/539.13 |

FOREIGN PATENT DOCUMENTS

| | | |
|---|---|---|
| JP | 2002-122652 | 4/2002 |
| KR | 1020000037429 | 7/2000 |
| KR | 1020000044068 | 7/2000 |

(Continued)

OTHER PUBLICATIONS

Notice of Allowance issued Oct. 8, 2009 in co-pending U.S. Appl. No. 11/021,778.

(Continued)

*Primary Examiner* — Wayne Cai
(74) *Attorney, Agent, or Firm* — H.C. Park & Associates, PLC

(57) ABSTRACT

A mobile communication system and a method for capturing information of other mobile communication terminals located within a distance from the user's mobile communication terminal may include a first mobile communication terminal for transmitting capture signal, location information and identification information; the second mobile communication terminals for transmitting location information and identification information of the second mobile communication terminals; and a base station for transmitting the GPS driving signal to the second mobile communication terminals and capturing information of the second mobile communication terminals.

2 Claims, 3 Drawing Sheets

FOREIGN PATENT DOCUMENTS

| | | |
|---|---|---|
| KR | 1020020054583 | 7/2002 |
| KR | 1020030041425 | 5/2003 |

OTHER PUBLICATIONS

Office Action issued Apr. 22, 2009 in co-pending U.S. Appl. No. 11/021,778.

Office Action issued Apr. 28, 2008 in co-pending U.S. Appl. No. 11/021,778.

Office Action issued Oct. 29, 2008 in co-pending U.S. Appl. No. 11/021,778.

Office Action issued Nov. 2, 2007 in co-pending U.S. Appl. No. 11/021,778.

Notice of Allowance issued Nov. 25, 2009 in co-pending U.S. Appl. No. 11/021,778.

Office Action issued Apr. 7, 2010 in co-pending U.S. Appl. No. 12/693,142.

Notice of Allowance issued Jul. 13, 2010 in co-pending U.S. Appl. No. 12/693,142.

* cited by examiner

MOBILE COMMUNICATION SYSTEM AND METHOD FOR CAPTURING INFORMATION OF OTHER MOBILE COMMUNICATION TERMINALS

CROSS-REFERENCE TO RELATED APPLICATIONS

The present application is a continuation of U.S. patent application Ser. No. 12/693,142, filed on Jan. 25, 2010, which is a continuation of U.S. patent application Ser. No. 11/021,778, filed on Dec. 23, 2004, now issued as U.S. Pat. No. 7,668,553 on Feb. 23, 2010, and claims priority from and the benefit of Korean Patent Application No. 10-2003-0097296, filed on Dec. 26, 2003, and Korean Patent Application No. 10-2004-0088333, filed on Nov. 2, 2004, all of which are hereby incorporated by reference for all purposes as if fully set forth herein.

BACKGROUND OF THE INVENTION

1. Field of Disclosure

The present disclosure relates to a mobile communication system, and more particularly, to a mobile communication system and a method for capturing information of other mobile communication terminals located within a range from the user's mobile communication terminal.

2. Discussion of the Background

Recently, with the development of mobile communication industry, the use of mobile communication service has spread, so most people carry a mobile communication terminal to use mobile communication services.

Nevertheless, if people who carry a mobile communication terminal face emergency situations (e.g., people may be attacked by criminals) it may be possible to collect evidence of the crime by using the mobile communication terminal.

The present disclosure relates to a mobile communication system and method for capturing information of other mobile communication terminals located within a certain distance from the user's mobile communication terminal.

SUMMARY

Exemplary embodiments of the invention disclose a mobile communication system for capturing information of mobile communication terminals including: a first mobile communication terminal for transmitting capture signal along with location information and identification information of the first mobile communication terminal, the capture signal being a signal to instruct capture of information of second mobile communication terminals; the second mobile communication terminals for transmitting location information and identification information of the second mobile communication terminals when receiving global positioning system (GPS) driving signal; and a base station for transmitting the GPS driving signal to the second mobile communication terminals and capturing information of the second mobile communication terminals located near the first mobile communication terminal, when receiving the capture signal from the first mobile communication terminal.

The first mobile communication terminal may include: an instructions input part for receiving instructions to capture information of the second mobile communication terminals; the GPS receiver for generating location information of the first mobile communication terminal based on GPS signal received from satellites; a control part for generating the capture signal and identification information and obtaining location information of the first mobile communication terminal by driving the GPS receiver, according to the instructions received through the instructions input part; and a transceiver part for transmitting the capture signal, the identification information of the first mobile communication terminal and the location information of the first mobile communication terminal to the base station.

The second mobile communication terminal may include: the GPS receiver for generating location information of the second mobile communication terminal based on GPS signal received from satellites; a control part for obtaining location information of the second mobile communication terminal by driving the GPS receiver and generating identification information of the second mobile communication terminal, when receiving the GPS driving signal from the base station; and a transceiver part for receiving the GPS driving signal from the base station and transmitting the location information and the identification information of the second mobile communication terminal to the base station.

The base station may include: a transceiver part for receiving the capture signal, the location information and the identification information from the first mobile communication terminal and transmitting the GPS driving signal to the second mobile communication terminals; a central processing part for activating a process for capturing information of the second mobile communication terminals, making the transceiver part transmit the GPS driving signal to the second mobile communication terminals located within a set distance from the first mobile communication terminal and, thus, capturing information of the second mobile communication terminals; and a data storing part for storing the information of the second mobile communication terminals captured through the central processing part, under controls of the central processing part.

An exemplary embodiment discloses a method of capturing information of other mobile communication terminals including: transmitting capture signal, identification information of a first mobile communication terminal and location information of the first mobile communication terminal from the first mobile communication terminal to a base station, according to instructions of the first mobile communication terminal to capture information of second mobile communication terminals; recognizing location of the first mobile communication terminal based on the capture signal, identification information and location information received by the base station and setting a range for capturing information based on the location of the first mobile communication terminal; transmitting a global positioning system (GPS) driving signal from the base station to the second mobile communication terminals; obtaining location information of the second mobile communication terminals by driving GPS receiver of the second mobile communication terminals which received the GPS driving signal and transmitting the location information of the second mobile communication terminals to the base station along with identification information of the second mobile communication terminals; and if the second mobile communication terminals are within the range, as a result of determination based on the location information of the second mobile communication terminals received by the base station, storing the location information and identification information of the second mobile communication terminals.

The method of capturing information of other mobile communication terminals may further include: providing the stored location information and identification information of the second mobile communication terminals to other information user.

An exemplary embodiment discloses a method of capturing information of other mobile communication terminals including: transmitting capture signal, identification information of a first mobile communication terminal and location information of the first mobile communication terminal from the first mobile communication terminal to a base station, according to instructions of the first mobile communication terminal to capture information of second mobile communication terminals; recognizing location of the first mobile communication terminal based on the capture signal, identification information and location information received by the base station; transmitting a global positioning system (GPS) driving signal from the base station to the second mobile communication terminals located within a pre-set distance from the first mobile communication terminal; obtaining location information of the second mobile communication terminals by driving GPS receiver of the second mobile communication terminals which received the GPS driving signal and transmitting the location information of the second mobile communication terminals to the base station along with identification information of the second mobile communication terminals; and if the second mobile communication terminals are within the range, as a result of determination based on the location information of the second mobile communication terminals received by the base station, storing the location information and identification information of the second mobile communication terminals.

The method of capturing information of other mobile communication terminals may further include: providing the stored location information and identification information of the second mobile communication terminals to other information user.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE ILLUSTRATED EMBODIMENTS

Hereinafter, an exemplary embodiment of the present invention will be described with reference to the accompanying drawings.

Figure 1:
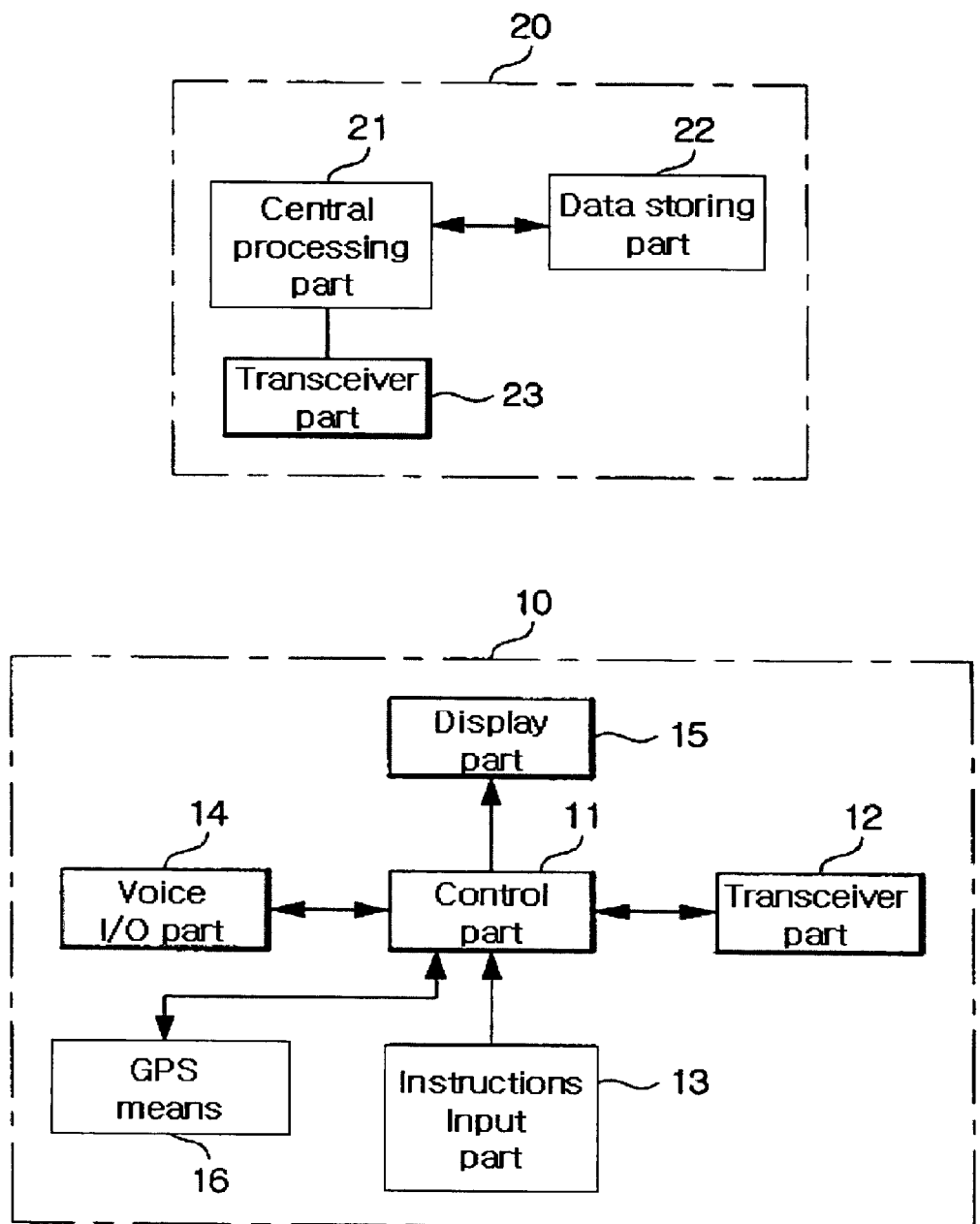
FIG. 1 illustrates a mobile communication system for capturing information of mobile communication terminals.

As illustrated in FIG. 1, a mobile communication system includes mobile communication terminals 10 and a base station 20. The mobile communication terminal 10 includes a control part 11, a transceiver part 12, an instructions input part 13, a voice input/output part 14, a display part 15 and global positioning system (GPS) receiver 16. The control part 11 controls general operation of the mobile communication terminal 10. The transceiver part 12 communicates with the base station 20. The instructions input part 13 is used for inputting information related to operation of the mobile communication terminal. The voice input/output part 14 processes voice signals inputted or outputted. The display part 15 displays information related to operations of the mobile communication terminal under controls of the control part 11. And the GPS receiver 16 recognizes location of the mobile communication terminal based on information received from satellites and provides the location information to the control part 11. The instructions input part 13 includes an operation button to instruct capture of information of other mobile communication terminals. Hereinafter, a mobile communication terminal that instructs capture of information will be termed as a first mobile communication terminal. On the other hand, mobile communication terminals of which information are captured by the first mobile communication terminal's instructions will be referred to as second mobile communication terminals. Herein, the second mobile communication terminal is not required to comprise the instructions input part 13. If the operation button is pressed by user, the control part 11 makes the transceiver part 12 transmit to the base station 20 the location information of the first mobile communication terminal obtained by driving the GPS receiver 16, and capture signal to instruct capture of information of the second mobile communication terminals. When the control part 11 makes the transceiver part 12 transmit the location information of the first mobile communication terminal to the base station 20, it transmits an identification number of the first mobile communication terminal and current time information to the base station 20 together.

The base station 20 ordinarily provides mobile communication service to the mobile communication terminals 10 including the first mobile communication terminal and the second mobile communication terminals and, in case of need, activates a process of capturing information of the second mobile communication terminals located within a certain distance from the first mobile communication terminal based on location of the first mobile communication terminal, according to instructions received from the first mobile communication terminal. The base station 20 includes a central processing part 21, a data storing part 22, and a transceiver part 23. The central processing part 21 controls general operations of the base station 20 and proceeds with processes for capturing information of the second mobile communication terminals. The transceiver part 23 communicates with the mobile communication terminals 10 including the first mobile communication terminal and the second mobile communication terminals. The data storing part 22 stores information of the second mobile communication terminals captured under controls of the central processing unit 21.

With the above-described mobile communication system, in case that the operation button to instruct capture of information of the second mobile communication terminals is pressed by user of the first mobile communication terminal in emergency situation, the first mobile communication terminal obtains location information of the first mobile communication terminal itself by driving the GPS receiver 16, and transmits capture signal and the location information of the first mobile communication terminal to the base station 20 through the transceiver part 12 of the first mobile communication terminal. If the base station 20 receives the capture signal and the location information from the first mobile communication terminal through transceiver part of the base station, the base station 20 activates process for capturing information of the second mobile communication terminals, recognizes location of the first mobile communication terminal and designates set range (for example, 10 m or 20 m from the first mobile communication terminal) based on the location of the first mobile communication terminal. Then, the base station 20 checks information of the second mobile communication terminals located within an area of the base station 20 and receives location information of the second mobile communication terminals through transceiver part of the base station 20 by transmitting GPS driving signal to the second mobile communication terminals through the transceiver part of the base station 20. Thereafter, the base station 20 gathers information of the second mobile communication terminals (e.g., identification number, location information and current time information) and stores the information in the data storing part 22. As described above, by providing a police station with information of the second mobile communication terminals, stored in the data storing part 22 of the base station 20, it may be possible to identify criminals who harm a user of the first mobile communication terminal.

Figure 2:
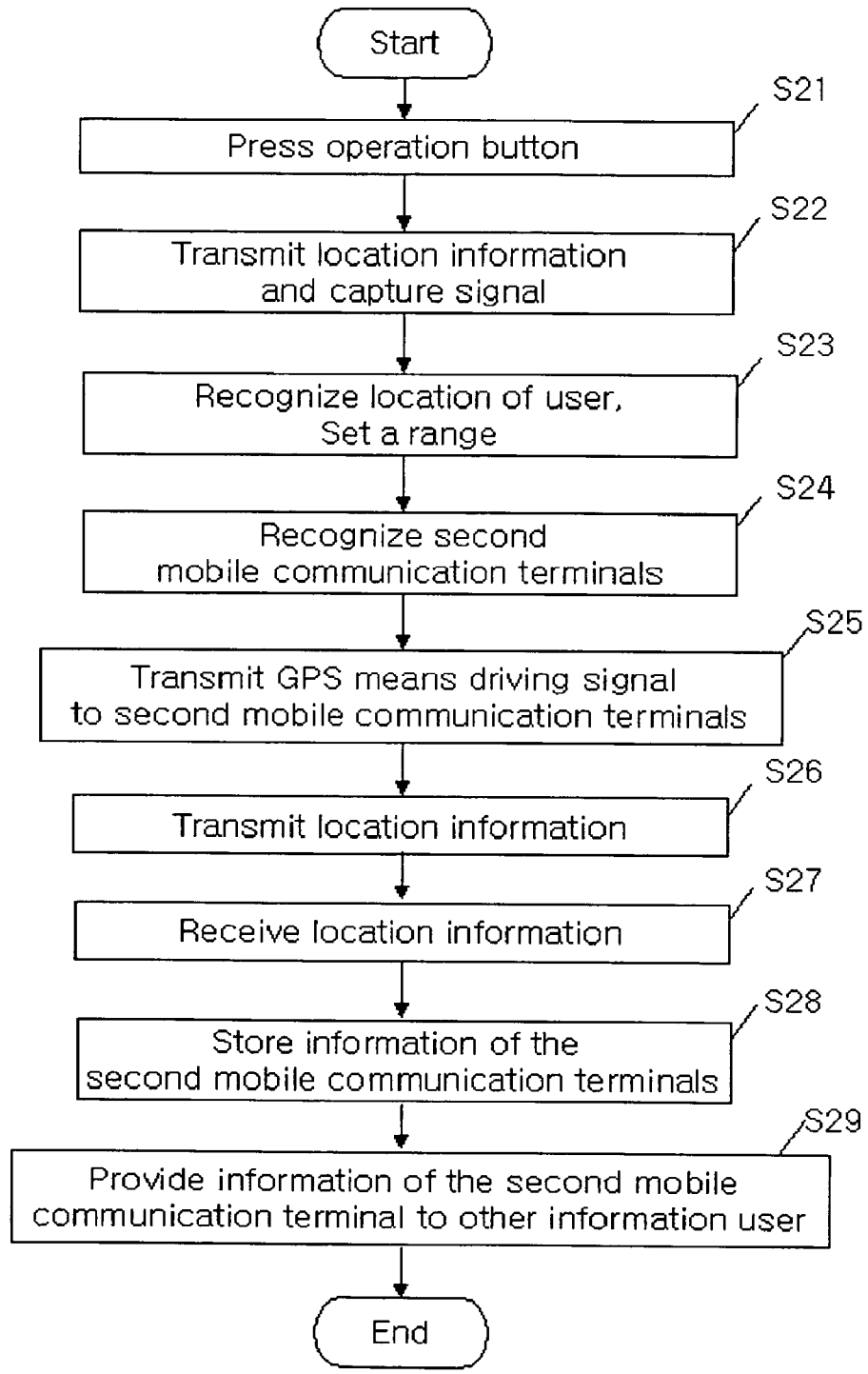
FIG. 2 is a flowchart illustrating a method of capturing information of mobile communication terminals.

The method for capturing information of other mobile communication terminals according to an exemplary embodiment of the present invention will be described with reference to the FIG. 2.

At first, a user of the first mobile communication terminal presses the operation button to instruct capture of information of the second mobile communication terminals, such as in emergency situation (S21). Then, the control part 11 of the first mobile communication terminal obtains location information of the first mobile communication terminal itself and makes the transceiver part transmit to the base station 20 the location information of the first mobile communication terminal and capture signal to instruct capture of information of the second mobile communication terminals (S22).

Then, the transceiver part 23 of the base station 20 receives the location information and the capture signal from the first mobile communication terminal and forwards the location information and the capture signal to the central processing part 21. The central processing part 21 recognizes that capture of information of the second mobile communication terminals is instructed and activates a process to capture information of the second mobile communication terminals. Also, the central processing part 21 recognizes location of the first mobile communication terminal and sets a range for capturing information of the second mobile communication terminals (e.g. 10 m or 20 m from the first mobile communication terminal) based on the location of the first mobile communication terminal (S23).

Also, the central processing part 21 of the base station 20 recognizes the second mobile communication terminals located within an area of the base station (S24) and transmits GPS driving signal to the second mobile communication terminals through transceiver part 23 (S25). The GPS driving signal is a signal that instructs the second mobile communication terminals to drive the GPS receivers of the second mobile communication terminals. Then, the second mobile communication terminals drive their own GPS receivers to obtain their own location information, and transmit to the base station 20 the location information, identification number of the second mobile communication terminals and current time information (S26). The base station 20 receives the location information, identification number of the second mobile communication terminals and current time information together (S27).

Figure 3:
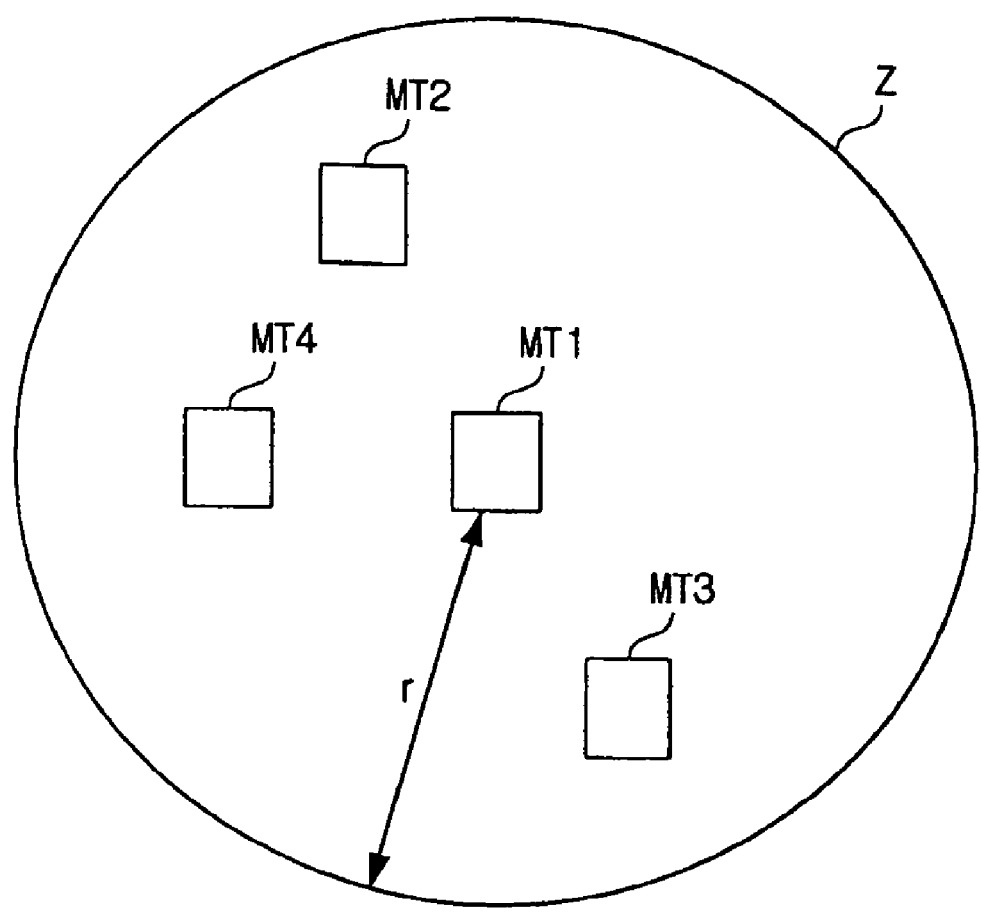
FIG. 3 illustrates a range where information of mobile communication terminals is captured.

The central processing part 21 of the base station 20 receives the location information, identification number of the second mobile communication terminals and current time information through the transceiver part 23 and recognizes the location information, identification number of the second mobile communication terminals and current time information. The central processing part 21 stores the location information, identification number of the second mobile communication terminals and current time information in the data storing part 22 (S28). By providing other information user such as police station with the information stored in the data storing part 22 (S29), it may be possible to identify criminals who harmed a user of the first mobile communication terminal. For example, as illustrated in FIG. 3, the range (Z) for capturing information of the second mobile communication terminals is set to have a certain radius "r" based on location of the first mobile communication terminal (MT1) that instructed capture of information of the second mobile communication terminal. If one user of the second mobile communication terminals (MT2~MT4) is a criminal who harmed the user of the first mobile communication terminal (MT1), it may be possible to obtain information of the criminal based on information of the second mobile communication terminals (MT2~MT4).

As described above, according to the embodiments of the present invention, by capturing information of the second mobile communication terminals located within a set distance from the first mobile communication terminal, according to instructions by user of the first mobile communication terminal, it is possible to easily identify users of the second mobile communication terminals.

Although exemplary embodiments of the present invention have been described for illustrative purposes, those skilled in the art will appreciate that various modifications, additions and substitutions are possible, without departing from the scope and spirit of the invention as disclosed in the accompanying claims and their equivalents.

What is claimed is:

1. A method for capturing information of a mobile communication terminal, comprising:
   in a base station,
   receiving a capture signal of a first mobile communication terminal and first location information of the first mobile communication terminal, the capture signal comprising an instruction to receive information of other mobile communication terminals;
   transmitting a global positioning system (GPS) driving signal to a plurality of other mobile communication terminals within a range of the base station in response to receiving the capture signal from the first mobile communication terminal; and
   receiving second location information from a second mobile communication terminal among the other mobile communication terminals to capture information of the second mobile communication terminal located within a set range of the first mobile communication terminal.

2. A base station in a mobile communication system to capture information of a mobile communication terminal, the base station comprising:
   a receiver to receive a capture signal of a first mobile communication terminal and first location information of the first mobile communication terminal, the capture signal comprising an instruction to receive information of other mobile communication terminals; and
   a transmitter to transmit a global positioning system (GPS) driving signal to a plurality of other mobile communication terminals within a range of the base station in response to receiving the capture signal from the first mobile communication terminal,
   wherein the receiver also receives second location information from a second mobile communication terminal among the other mobile communication terminals to capture information of the second mobile communication terminal located within a set range of the first mobile communication terminal.

* * * * *